United States Patent [19]

Goldenberg

[11] Patent Number: 4,598,122

[45] Date of Patent: Jul. 1, 1986

[54] POLYOXIRANE CROSSLINKED POLYVINYL ALCOHOL HYDROGEL CONTACT LENS

[75] Inventor: Merrill Goldenberg, Riverdale, N.Y.

[73] Assignee: Ciba-Geigy Corporation, Ardsley, N.Y.

[21] Appl. No.: 693,484

[22] Filed: Jan. 22, 1985

[51] Int. Cl.$^4$ ............................................. C08F 8/00
[52] U.S. Cl. .................................... 525/61; 523/106; 523/406; 523/409; 525/115; 525/118; 525/330.6; 525/385
[58] Field of Search ............... 523/106, 406, 409; 525/61, 115, 118, 330.6, 385

[56] References Cited

U.S. PATENT DOCUMENTS

| | | | |
|---|---|---|---|
| 2,713,567 | 7/1955 | Scheibli | 525/61 |
| 2,774,748 | 12/1956 | Howard et al. | 525/61 |
| 2,844,570 | 7/1958 | Broderick | 525/61 |
| 2,941,988 | 6/1960 | Wolf | 525/61 |
| 3,052,652 | 9/1962 | Halpern | 525/61 |
| 3,099,646 | 7/1963 | Scardiglia | 525/61 |
| 3,106,543 | 10/1963 | Milne | 525/61 |
| 3,232,916 | 2/1966 | Fogle | 525/61 |
| 3,600,458 | 8/1971 | Jamison | 525/61 |
| 3,679,437 | 7/1972 | Oppenheimer et al. | 525/61 |
| 4,350,773 | 9/1982 | Itagaki et al. | 521/31 |
| 4,426,492 | 1/1984 | Steckler | 525/61 |

FOREIGN PATENT DOCUMENTS

| | | | |
|---|---|---|---|
| 0003689 | 1/1977 | Japan | 525/61 |
| 0143496 | 11/1979 | Japan | 525/61 |
| 6090804 | 7/1981 | Japan | 525/61 |

OTHER PUBLICATIONS

T. Electrochem. Soc. (USA) vol. 129, No. 2, (Feb. 1982), Hsu & Sheibley.

Primary Examiner—Joseph L. Schofer
Assistant Examiner—J. M. Reddick
Attorney, Agent, or Firm—Michael W. Glynn; Irving M. Fishman

[57] ABSTRACT

Optically clear soft contact lenses of a polyoxirane crosslinked polyvinyl alcohol having a weight average molecular weight of at least 8,000 and degree of hydrolysis of at least 93% and their preparation are disclosed. The materials are characterized by their ability to be boiling water sterilized, and their high water content, high oxygen permeability and high optical clarity.

12 Claims, No Drawings

POLYOXIRANE CROSSLINKED POLYVINYL ALCOHOL HYDROGEL CONTACT LENS

BACKGROUND OF THE INVENTION

This invention relates to soft hydrogel contact lenses, made of polyoxirane crosslinked polyvinyl alcohol, which are swollen but do not dissolve in water.

In general, most existing hydrogel soft contact lens materials are based on HEMA, also known as hydroxyethylmethacrylate or as ethyleneglycolmonomethacrylate, with one or more optional comonomers as described in U.S. Pat. Nos. 2,976,576, 3,841,985 and 3,985,697. Other hydrogels based on N-vinylpyrrolidone copolymers and acrylamide copolymers are disclosed in U.S. Pat. Nos. 3,639,524 and 3,929,741. These prior art hydrogel polymers suffer from several inherent problems: (a) all contain hydrolyzable ester or amide linkages, (b) all may contain toxic residual monomers or oligomers that can be released into the eye, (c) most lenses are made by either of two procedures, one requiring costly lathing and polishing steps and the other using delicate spin casting techniques where polymerization, crosslinking, and shaping are done simultaneously, (d) all offer, due to the presence of ester and especially amide linkages, sites for enzymatic attack initiating a hydrolytic process or antigen-antibody reactions (i.e. deposition), and (e) most do not have sufficient dissolved oxygen permeability to prevent corneal edema with the consequent risk of permanent eye damage.

It is an object of the present invention to provide soft contact lenses obviating or substantially reducing the aforementioned drawbacks of the prior art.

Polyvinyl alcohol, also known as PVA, films and gels have been reported as opthalmic inserts in the lower conjunctival sac when imbibed with antibiotics such as tetracycline, pilocarpine, atropine and the like. Such materials are either in the form of a crosslinked film or as a water soluble viscous solution or gel. See, for example, Y. F. Maichuk, Ophthalmic Drug Inserts, *Invest. Ophthalmol.*, Vol. 14, pages 87–90 (1975); D. W. Lamberts, Solid Delivery Devices, *Int. Ophthalmol. Clinic*, Vol. 20, No. 3, pages 68–69 (1980) and Y. F. Maichuk, *Antibiotik*, Vol. 12, No. 4, pages 432–5 (1967).

Many reagents have been suggested for crosslinking PVA—these include organic and inorganic reagents as well as radiation ($\gamma$ or X-rays).

For example, Tanaka, Japanese Patent 72/06910, describes a method of making a thick block of crosslinked PVA by heating together PVA and formal in using acid catalysis. The key step in this procedure is to simultaneously dry and heat the mixture using a water vapor-porous paper mold until a crosslinked hard block of PVA results which, for example, can be molded and then swollen in water to form a contact lens. There are several problems with this procedure and the resultant material:

1. The drying process induces crystalline regions into the PVA matrix in an uncontrolled fashion. Once swollen or boiled in water, the material experiences non-reproducible dimensional increases.

2. This crosslinking reaction requires fairly high temperature ($\sim 130°$ C.) sufficient to initiate an acid catalyzed dehydration reaction along the PVA backbone. The resulting conjugated double bonds gives rise to a yellow color in the PVA matrix.

3. The crosslinking of PVA with formaldehyde results in an acetal linkage which is readily reversible under aqueous pH conditions, especially under the temperature conditions used for heat sterilization.

4. The processing, i.e. machining and polishing, of the PVA block as with other xerogels is expensive and time consuming.

The Japanese patent application 50/115258 discloses a process and material that may have contact lens use. A dialdehyde of PVA is mixed with PVA and an acid catalyst with the solution then coated on a glass plate, air dried and then heat treated at $\sim 80°$ C. This process also requires a drying step and high temperature to force the crosslinking reaction. As with the Japanese patent 7206910 one has problems with induced crystallinity and also the reversible acetal crosslinkage.

In U.S. Pat. No. 3,232,916, crosslinked PVA for battery separators was made by dissolving PVA and a polyoxirane in water with an acid catalyst spreading the mixture upon a smooth surface, evaporating off the water at room temperature and then crosslinking at high temperature. Although this material may be useful for ion permeable battery separators it would be undesirable in contact lens use, as the water evaporation step induces crystallinity and the subsequent crosslinking leads to irreproducible dimensional changes upon heat sterilization. Also, the high temperature employed to effect crosslinking colors the material by a dehydration mechanism. Thus, the patent's example 2, using an amine catalyst, results in a golden colored film.

The Japanese patent 49/35466 eliminated the difficulties arising from a drying step by placing the aqueous PVA solution into a sealed mold. However, the actual crosslinking agent used presents various problems. For example, by their using 0.4% PVA in water and using $\gamma$ or X-rays to crosslink the PVA necessitates long irradiation times. The radicals that are produced not only crosslink PVA but also cause its degradation. The resultant material tends to be weak and brittle, not only due to the short length between crosslinked portions ($\sim 1.5$ Å), but also due to the fragmented nature of the crosslinked chains. In this patent's other crosslinking procedure, PVA was mixed with polyacrylic acid under acid catalysts and heated for 2 days. The resultant crosslinkage produced is a hydrolyzable ester. In addition, the unreacted carboxylic acid groups present render the dimensional changes of the final hydrogel sensitive to pH fluctuations in the tear fluid. Thus, not only is the final material not stable to the pH environment of tear fluids but undesirably long reaction times are necessary to form the gel.

Polyvinyl alcohol crosslinked with glyoxal has been proposed as a contact lens material, e.g. in U.S. Pat. No. 3,408,429. Unfortunately, the acetal and hemiacetal group formation which results from the crosslinking reaction is reversible under mildly acidic conditions, resulting in the potential release of glyoxal from the crosslinked material. The reversibility increases greatly under temperature conditions used for heat sterilization. Glyoxal is known to be an irritant to skin and mucosa. Also, no disclosure of PVA molecular weight and no specifics concerning the amount of water present in the crosslinking step are disclosed.

It is an object of the present invention to provide soft contact lenses obviating or substantially reducing the aformentioned drawbacks of the prior art.

It is a further object of the present invention to provide contact lenses comprising polyvinyl alcohol which have been crosslinked with a multifunctional oxirane compound such that the crosslinked lenses are insoluble in the ocular tear environment, can be boiling water sterilized, possess a high water content, high dissolved oxygen permeability, low protein absorption and good mechanical strength. Lenses of this type also are of value as an "eye bandage" for non-severe corneal damage.

It is a further object of the invention to provide rapid, simple low cost molding processes for the preparation of such lenses.

Many available soft contact lenses are easily damaged being fragile, easily scratched and torn. There is a constant risk of tearing the material with a finger nail when inserting or removing from the eye. They also must be frequently sterilized to prevent bacterial growth in the hydrogel network and constantly cleaned to remove all types of deposits e.g. protein, lipids, and calcium salts. These deposits cloud the lens and become a serious source of eye irritation e.g. Giant Papillary Conjunctivitus.

The instant inventive contact lenses have the additional advantage in that they are economically prepared and thus can be discarded at regular intervals, i.e. disposable.

DETAILED DESCRIPTION OF THE INVENTION

The present invention provides optically clear soft contact lenses of polyvinyl alcohol having a weight average molecular weight of at least about 10,000, crosslinked with a multifunctional oxirane in an effective amount of dimensionally stabilize said lenses, said lenses containing from about 70 to 98%, preferably between 85-96%, water based on said lenses, and said lenses being substantially dimensionally stable in boiling water. By dimensionally stable in this context is meant that the swollen article can be placed in boiling water, and upon cooling to ambient conditions, substantially retains its shape.

Preferably, the polyvinyl alcohol has a weight average molecular weight of at least about 50,000.

As an upper limit, the polyvinyl alcohol may have a weight average molecular weight of up to 1,000,000. Preferably, the polyvinyl alcohol has a weight average molecular weight of up to 300,000.

Polyvinyl alcohol is ordinarily prepared by hydrolysis of the corresponding polyvinyl acetate. Advantageously, the degree of hydrolysis should be at least 93%. In a preferred embodiment the polyvinyl alcohol contains less than 1% of the polyvinyl acetate units.

Ordinarily, polyvinyl alcohol predominately possesses a poly(2-hydroxy) ethylene structure. However, the polyvinyl alcohol starting material may also contain a minor amount of hydroxyl groups in the form of 1,2-glycols, such as copolymer units of 1,2-dihydroxyethylene in the chain, obtained for example, by alkaline hydrolysis of vinyl acetate-vinylene carbonate copolymers. Advantageously, such a copolymer contains less than 20 mole % of such units, preferably less than 10 mole % of such units.

Moreover, the polyvinyl alcohol may contain minor amounts of copolymer units of ethylene, propylene, acrylamide, methacrylamide, dimethacrylamide, hydroxyethylmethacrylate, methyl methacrylate, methyl acrylate, ethyl acrylate, vinyl pyrrolidone, hydroxyethylacrylate, allyl alcohol, and the like. Preferably, the polymer should contain not more than 5 mole % of units other than those of vinyl alcohol. Most preferably, the polyvinyl alcohol contains less than 1 mole % of such copolymer units.

Commercial polyvinyl alcohol resin may be used, such as Elvanol 71-30 manufactured by DuPont, Vinol 165 by Air Products, Gohsenol NH-26 by Nippon Gohsei, Polysciences MW=133,000, 99% hydrolyzed and BF 24 by Chang Chun. Some other manufacturers are Monsanto (Gelvatol), Hoechst (Mowiol), Wacker (Polyviol) as well as the Japanese manufacturers Kuraray, Denki, Shin-Etsu and Unitika.

One method of roughly estimating the molecular weight of polyvinyl alcohol is by the viscosity of 4% aqueous solution at 20° C.: for example a viscosity of 1-2 cP corresponds to a molecular weight of ~3000, a viscosity of 30 cP corresponds to a molecular weight of ~80,000 (99-100% hydrolyzed) while a viscosity of 60 cP corresponds to a molecular weight of ~130,000 (99-100% hydrolyzed). Preferably the polyvinyl alcohol to be crosslinked should have a minimum viscosity of approximately 25 cP which corresponds to molecular weight of ~70,000 (99-100% hydrolyzed). The upper limit of molecular weight is dictated by the ability to stir and pour solutions without introduction of air bubbles—this value is approximately 60-70 cP. It is

TABLE 1

PVA MOLECULAR WEIGHT COMPARISON

| Manufacturer | Manufacturers' Claimed $M_w$ | Viscosity, CPS* | GPC, $M_w$ |
|---|---|---|---|
| Polysciences | 133,000 | — | 66,000 |
| Scientific Polymer Products | 126,000 | 60 | 45,000 |
| Scientific Polymer Products | 115,000 | — | 69,000 |
| Shin-Etsu Poval C25 | 110,000 | 65 ± 5 | 38,000 |
| Air Products Vinol 350 | 106-110,000 | 55-65 | 43,000 |
| Hoechst, Moviol 66-100 | 100,000+ | 66 ± 4 | 26,000 |
| DuPont, Elvanol HV | 100,000+ | 55-65 | 50,000 |
| Polysciences | 78,000 | 28-32 | 37,000 |
| Sigma | 45,000 | 12-14 | 30,000 |
| Polysciences | 25,000 | 6-8 | 20,000 |
| Aldrich | 14,000 | — | 33,000 |
| Scientific Polymer Products | 14,000 | — | 22,000 |

*4% aqueous solutions at 20° C.

important to note that the manufacturers' claim of molecular weight (based on viscosity data) does not necessarily correspond to that obtained by gel permeation chromatography (GPC) which is dependent on the standards used. In Table 1 are presented a range of polyvinyl alcohols and the GPC results determined using polyacrylamide standards in aqueous solution.

One class of polyoxirane compounds comprises polyglycidyl compounds of the formula

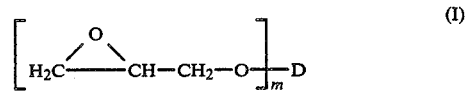

(I)

where m is 2-4, and D is an organic divalent to tetravalent radical, the valence of which corresponds to m and wherein each of the glycidyloxy groups are covalently bonded to a carbon atom of D, and mixtures thereof. Preferably the compounds of formula I are polyglycidyl ethers or carboxylate esters.

The organic radical D may be aliphatic, heterocyclic, aromatic, or araliphatic which is bound to the glycidyl oxygen directly or through a carbonyl group.

In one preferred embodiment, m is 2 and D is aliphatic. Especially suitable aliphatic radicals include alkylene of up to 25 carbon atoms, or said alkylene interrupted by one or more hetero atoms, such as oxygen, or cyclohexylene. More preferably D is alkylene of 2 to 6 carbon atoms, or -$C_2$-$C_4$-alkylene(O-$C_2$-$C_4$-alkylene)$_p$ where p is 1 to 5. Also especially suitable are the aforementioned aliphatic radicals terminating in carbonyl groups to form the corresponding diglycidyl carboxylate ester.

In another preferred embodiment, m is 2 and D is aromatic. Especially suitable aromatic radicals include phenyl, biphenyl, phenyl-lower alkylene-phenyl, phenyloxyphenyl, or phenylsulfonylphenyl, which are further unsubstituted or are substituted by lower alkyl, lower alkoxy, or halo.

Another class of polyoxirane compounds comprises polyglycidyl compounds of the formula

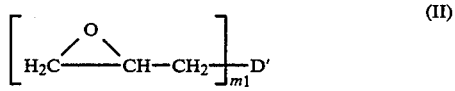

where $m_1$ is 2–4 and D' is an organic divalent to tetravalent radical, the valence of which correspond to $m_1$, and wherein each of the glycidyl radicals are covalently bonded to a nitrogen or carbon atom of D', and mixtures thereof.

Preferably D' is aliphatic, aromatic, heterocyclic or araliphatic.

In a preferred subembodiment $m_1$ is 2 and D' is a bivalent hydantoin radical which is bound to the glycidyl groups through the respective nuclear nitrogen atoms, and said hydantoin is otherwise unsubstituted or substituted by lower alkyl.

In an alternate preferred subembodiment, $m_1$ is 2 and D is alkylene of of up to 6 carbon atoms.

A third class of polyoxirane compounds are those of the formula

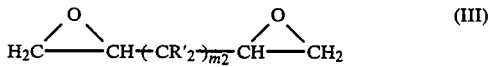

where $m_2$ is 0, 1 or 2 and each R' independently represents hydrogen or lower alkyl.

Mixtures of the above polyoxiranes of formulae I, II and III may also be employed. In fact, in many instances, mixtures of polyoxiranes result in cross-linked hydrogel lens materials having optimal properties of flexibility, high water content, and strength.

The percent water present in the swollen cross-linked contact lens desirably is between 70–98%, preferably between 85–96%, and will depend in large part on the nature and amount of organic multifunctional oxirane, or oxirane mixture, chosen.

Moreover, the polyvinyl alcohol used should be substantially hydrolyzed, i.e. preferably greater than 88% mole percent.

It has been found that, ordinarily, only a portion of the oxirane crosslinking agent undergoes inter-chain crosslinking, the remainder, forming pendant groups, or intra-chain linking reaction, or is not incorporated. Ratios of polyoxirane to polyvinyl alcohol reactants can therefore vary widely, depending upon the polyoxirane reactivity and reaction conditions, but generally are between about 3:1 to about 1:3 by weight.

The following polyoxirane compounds, most of which are readily available, and all of which known, can be used in this process: polyglycidyl ethers of polyhydric alcohols such as methanediol, 1,2-ethanediol, propanediol, 1,4-butanediol, pentanediol, 1,6-hexanediol, neopentyl glycol, pentaerythritol, sorbitol, glycerol (1,3 and 1,2), trimethylolpropane, diglycerol, poly(ethyleneglycol)n where n=1–5, poly(propyleneglycol)$_n$ where n=1–5, 1,3-bis[3-hydroxypropyl]-1,1,3,3-tetramethyldisiloxane, 1,2,6-trihydroxyhexane, 1,1,1,3,5, 7,7,7-octamethyl-3,5-bis (3-hydroxypropyl) tetrasiloxane, 1,4-bis (hydroxymethyl) cyclohexane, polyglycidyl ethers of polyhydric phenols such as bisphenol A, tetrabromobisphenol A, resorcinol, phloraglucinol, 1,1,2,2-tetra(p-hydroxyphenyl)ethane, bisphenol C, bisphenol F, dimethyl bisphenol C, bisresorcinol B, bisresorcinol F, bisresorcinol, trihydroxybiphenyl, tetramethyl bisphenol A, 1,1,1,1-triphenolethylmethane, phenol-formaldehyde novolac (n=1–5), o-cresol-formaldehyde novolac (n=1–5), p-aminophenol, 1,1,3-tris(p-hydroxyphenyl)propane, bisphenol hexafluoroacetone, p-dihydroxyoctafluorobiphenyl, 1,3-bis(hydroxymethyltrifluoromethyl) benzene, 1,4-bis (hydroxymethyltrifluoromethyl) benzene, triphenolmethane, 2,6-diglycidyl-phenol, N,N-diglycidyl-p-aminophenol, dihydroxybenzene (1,2 and 1,3 and 1,4), methylol-substituted-bis-phenol A, 1,1,2,2-tetrakis (p-hydroxyphenyl) ethane, 2-hydroxypropylbutyl ether of bis-phenol A, bis (2-dihydroxynaphthyl) methane, bis(4-hydroxyphenyl) sulfone, polyglycidyl esters of polycarboxylic acids such as inoleic dimer acid, 1,2-carboxycyclohexanoic acid, phthalic acid, isophthalic acid, terephthalic acid, tetrahydrophthalic acid, adipic acid, dimerized ($C_8$-$C_{24}$) fatty acids, polyoxiranes of aliphatic esters such as 3,4-epoxycyclohexylmethyl 3,4-epoxycyclohexane carboxylate, bis (3,4-epoxy-6-methylcyclohexylmethyl) adipate, oxiranoctanoic acid, 3-octyl,1-methyl-1,2-ethanediylester, cycloaliphatic polyoxiranes, such as vinylcyclohexene dioxide, bis(2,3-epoxycyclopentyl) ether, 3-(3,4-epoxy cyclohexane)-8,9-epoxy-2,4-dioxaspiro[5.5]-undecane, 2,2'-bis (3,4-epoxy cyclohexyl) propane, 2,2'-bis[4-(2,3-epoxypropyl)cyclohexyl] propane, bis[4-(N-2,3-epoxypropyl-N-methanesulfonyl)aminocyclohexyl]methane, 2,2-bis[4-(2,3-epoxy-2-trifluoromethyl)cyclohexyl] propane, heterocyclic nitrogen-containing glycidyl compounds such as of the hydantoin type e.g. diglycidyldimethylhydantoin, diglycidylbutylethyl hydantoin, 1-glycidyl-3-(2-glycidoxypropyl)-5,5-dimethylhydantoin, 1,3-bis(5,5-dimethyl)-1-glycidylhydantoin-3-yl)-2-glycidyloxypropane, 1,3-diglycidyl-5,5-pentamethylene hydantoin, 5-ethyl-1,3-digycidyl-5-methylhydantoin, triglycidyl-bishydantoins, and other types such as 1,3,5-triglycidylisocyanurate, 2,4,6-triglycidyl-s-triazine, 2,4,6-triglycidoxy-s-triazine, triglycidyltris (hydroxyethyl) isocyanurate. Additional oxirane containing compounds include, epoxidized polybutadiene (M.W. less than 500), 2,2-bis[4-(2,3-epoxy-2-trifluoromethyl)-phenyl]hexafluoroacetone, 2,2-bis[4-(2,3-epoxy-2-trifluoromethyl)phenyl] propane, tetrafluororesorcinol epichlorohydrin, N,N-diglycidyl-o-toluidine, butane diepoxide, diglycidyl ether, tetraglycidylmethylenedianiline.

On respect to the ease of availability and crosslinking in aqueous media, preferred polyoxiranes are those which have some water solubility such as the lower molecular weight polyglycidyl ethers of polyhydric alcohols or those of the heterocyclic nitrogen-containing type. The most preferred are those of the diglycidyl ethers of polyhydric alcohols of short chain length, with very high water solubility, such as 1,2-ethanediol, propanediol (1,2 and 1,3), 1,4 butanediol, dimethanol ether, 1,3,5-pentanetriol, 1,4-pentanediol, poly(ethyleneglycol) n=1 to 3 and the like. Besides water, other possible solvents for polyvinyl alcohol and the polyoxirane are polar solvents such as dimethyl sulphoxide, dimethyl formamide, phosphoric acid tri-dimethylamide, N-methyl-2-pyrrolidone, dimethyl acetamide, acetamide and acetonitrile.

The crosslinking reaction under catalytic conditions may be depicted as follows:

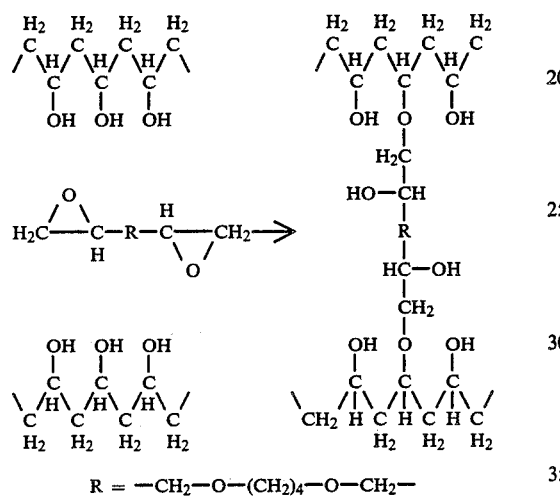

$$R = -CH_2-O-(CH_2)_4-O-CH_2-$$

For most polyoxirane compounds a catalyst is desired for reaction with the polyvinyl alcohol within a few hours. These catalysts can be either Lewis acid or Lewis bases. Preferably the catalyst is an inorganic base such as sodium or potassium hydroxide or a tertiary amine such as triethylamine. Suitable acid catalysts would include fluoroboric acid, zinc fluoroborate, zinc chloride, aluminum chloride, hydrochloric, nitric and sulfuric.

The temperature and reaction time for crosslinking are inversely related and do not require stringent control. In general, the reagents, which include polyvinyl alcohol, solvent, polyoxirane and catalyst, are mixed together at room temperature but the crosslinking is performed at higher temperature preferably at 50° C. for 1 hour. After this time, the material is equilibrated in distilled water, then placed in boiling water for 10-20 minutes and then left equilibrating in distilled water at room temperature.

The optimal catalyst level is determined, for example, using sodium hydroxide and 1,4-butanediol diglycidyl ether (BUDGE) on a cast polyvinyl alcohol gel in order to maximize the proximity of the hydroxyl groups in adjacent chains and hence maximize crosslinking probability. A 14% aqueous solution of DuPont's Elvanol 71-30 was cast 50 mils thick, air dried at room temperature overnight, then annealed at 150° C. for 30 minutes. This film was soaked in a 40% aqueous BUDGE solution for 1 hr. to which was then added an equal volume of a certain percentage sodium hydroxide and the whole mixture reacted at 50° C. or room temperature. The final material was placed in boiling water for 10 minutes. It was found that when the reaction was performed at 50° C., decreasing the final hydroxide concentration from 5% to 0.5% weakened the gel and that at 0.05% the gel dissolved i.e. indicative of no crosslinking. That this crosslinking reaction has a substantial activation energy is revealed when gel dissolution occurred at room temperature, with 0.5% sodium hydroxide, as opposed to crosslinking at 50° C. In both the 50° C. and room temperature cases, gel dissolution (i.e. no crosslinking) occurred at 0.05% NaOH i.e. pH 12. Thus the minimum pH for base catalyzed crosslinking is ~pH 13.

One should note that under basic (and acidic) catalysis an oxirane is hydrolyzed to a glycol. Thus in an aqueous polyvinyl alcohol-polyoxirane system, the oxirane can undergo two reaction pathways, reaction with a hydroxyl group or hydrolysis. From NMR data, on mixing BUDGE with 5% sodium hydroxide at room temperature it was determined approximately 5% of the oxirane groups hydrolyzed in 20 minutes while all hydrolyzed in less than 20 minutes at 60° C. At room temperature, on decreasing the sodium hydroxide concentration to 0.5%, 50% of the oxirane groups are hydrolyzed in 20 hr. i.e. approximately 1% are hydrolyzed in 20 minutes.

Thus after the crosslinking reaction and equilibration in water the internal structure of the material could be represented as follows:

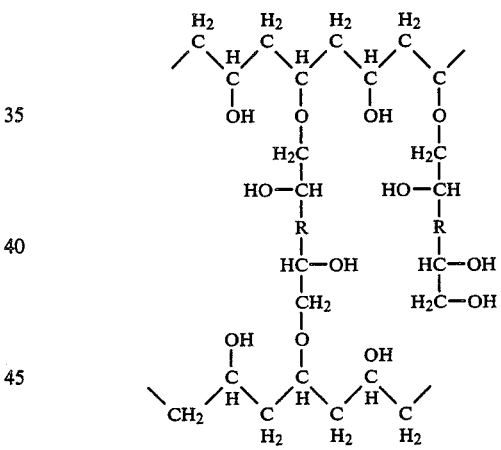

The following example shows the effect of increased crosslinking with BUDGE on the water content of solution state crosslinked polyvinyl alcohol. Note: Reaction conditions, Elvanol 71-30, 2-2.5% NaOH, 55°, 1 hr. in a sandwich mold.

EXAMPLE 1

| Weight Ratio (PVA:BUDGE) | % PVA in Solution | % Water Content After Boiling |
|---|---|---|
| 3.3:1 | 10.5 | No crosslinking |
| 1.5:1 | 10.5 | 96.20 |
| 1.3:1 | 10.3 | 95.94 |
| 1.1:1 | 10.2 | 95.20 |
| 1:1 | 10.1 | 95.04 |
| 1:1 | 9.5 | 95.61 |
| 1:1.17 | 9.8 | 93.84 |
| 1:1.33 | 9.7 | 93.13 |
| 1:2 | 9.1 | 91.21 |

One notes that at levels of BUDGE which are ~30% of that of polyvinyl alcohol (~10% polyvinyl alcohol in solution) crosslinking does not occur. A level of BUDGE that is 66% or greater with respect to that of polyvinyl alcohol content does in fact crosslink the polyvinyl alcohol into a film and increasing the levels of BUDGE decreases the final water content of the resultant boiled film. As the crosslinking increases to extremely high levels (polyvinyl alcohol:BUDGE=1:2) the resultant film acquires a slight haze.

The following example shows the insensitivity of the water content of the boiled BUDGE crosslinked polyvinyl alcohol to the level of sodium hydroxide in the range 0.8 to 2.2%. Reaction conditions: 55° for 1 hour in a sandwich mold.

EXAMPLE 2

| PVA Type | % | BUDGE/PVA | % NaOH | % Water Content |
|---|---|---|---|---|
| Elvanol 71-30 | 12 | 1.0 | 0.8 | 95.90 |
| " | 11.1 | 1.0 | 1.48 | 94.21 |
| " | 10.3 | 1.0 | 2.07 | 94.43 |
| " | 11.3 | 1.0 | 2.2 | 93.56 |

The following example shows a time study of polyvinyl alcohol crosslinked with BUDGE in plastic contact lens molds (TPX) made from poly (α-methylpentene). Reaction conditions:
Elavnol 71-30/BUDGE=1/1, 11.1% polyvinyl alcohol, 1.48% NaOH, 55° C.

EXAMPLE 3

| Reaction Time (Min.) | Observation on Removal from Mold | Observation on Effect Boiling H$_2$O |
|---|---|---|
| 15 | sticky | amorphous mass |
| 30 | tore | retained shape |
| 45 | tore | retained shape |
| 60 | intact | retained shape |

After 15 minutes the material was only lightly crosslinked as evidenced by its loss in shape after the boiling water treatment. After 60 minutes reaction time the material not only crosslinked but also became sufficiently strong to be removed from the molds without tearing. Thus experimental parameters determined for crosslinking of polyvinyl alcohol, by use of sandwich molds, are similar for molds used specifically for contact lenses.

The following example demonstrates the reproducibility of the dimensional change of the polymerized material on going from the mold to being equilibrated in distilled water. Discs were cut from the sheet with a cork borer immediately after crosslinking.

Reaction Conditions: Elvanol 71-30/BUDGE=1/1, 11.1% polyvinyl alcohol, 1.48% NaOH, 55°, 1 hour.

EXAMPLE 4

| Sheet # | Sample | % Dimensional Change Initial to Boiled | % Water Content Boiled Film |
|---|---|---|---|
| 1 | a | 35.3 | 94.47 |
| 1 | b | 34.5 | |
| 1 | c | 38.3 | |
| 2 | a | 32.8 | 92.86 |
| 2 | b | 36.0 | |
| 2 | c | 33.9 | |
| 3 | a | 35.84 | |
| 3 | b | 38.46 | |
| 3 | c | 42.20 | |
| 4 | a | 35.5 | 95.04 |
| 4 | b | 38.8 | |
| 4 | c | 37.9 | |
| Mean | | 36.6 ± 2.6 (7%) | |

Although there is a small spread in the data this can be accounted for by the freshness of the preparation of the solutions. In all aqueous solutions of higher molecular weight polyvinyl alcohol of high degree of hydrolysis there is a tendency to form a gel network on standing at room temperature with the more concentrated solution gelling in a shorter time. This phenomenon may contribute to inhomogeneities in all subsequent solutions. Thus sample solution preparation and not the crosslinking reaction seems to be the dominant contributor to dimensional variability. Thus, it is extremely important that all solutions be prepared fresh and loaded into molds within minutes of mixing to ensure reproducible dimensional changes.

One method to reduce the water content of the final boiled material is to use lower molecular weight polyvinyl alcohol since it can be dissolved to a higher concentration. At PVA concentrations in the neighborhood of 20% solids (10,000–30,000 molecular weight and greater than 95% hydrolyzed) the solutions are quite viscous and at much higher concentrations bubble removal and pouring are difficult.

The following example describes the BUDGE crosslinking of high concentrations of 14,000 molecular weight, 100% hydrolyzed polyvinyl alcohol (Aldrich).

EXAMPLE 5

| Concentration in Final Solution (%) | | Ratio PVA: Cross-linker | Dimensional Change (%) | Water Content | Observation |
|---|---|---|---|---|---|
| PVA | NaOH | | | | |
| 19.35 | 1.61 | 1:1 | 29.57 | 84.28 | brittle, easily torn |
| 21.43 | 1.79 | 2:1 | 36.84 | 89.38 | — |
| 22.47 | 1.50 | 2.2:1 | 63.48 | 93.87 | — |
| 22.73 | 1.52 | 2.5:1 | — | 95.96 | soft, weak film |
| 23.08 | 1.54 | 3:1 | — | — | soft, weak film |
| 24.00 | 1.60 | 6:1 | — | — | did not crosslink |

As shown in the above table, in order to reduce the water content to a value below 90% it is necessary to have a high concentration of polyvinyl alcohol and a high degree of crosslinking (1:1)—however, the material becomes brittle and is easily torn. In order to reduce the brittleness the crosslinking ratio was reduced, however the dimensional changes increased drastically with material becoming extremely weak and its water content increasing.

Note: Very similar trends are obtained when one uses a slightly higher molecular weight PVA i.e. 25,000 (98.5% hydrolyzed).

The following example shows the effect of using the more flexible diepoxide poly(ethyleneglycol 200)digycidyl ether (PEGE 200) with a high concentration of polyvinyl alcohol, 14,000 molecular weight, 98.5% hydrolyzed.

EXAMPLE 6

| Crosslinker | Concentration in Final Solution (%) PVA | Concentration in Final Solution (%) NaOH | Ratio PVA: Crosslinker | Dimensional Change (%) | Water Content | Observation |
|---|---|---|---|---|---|---|
| BUDGE | 18.8 | 1.25 | 1:1 | 37.6 | 90.80 | brittle |
| 2 BUDGE: 1 PEGE 200 | 18.8 | 1.25 | 1:1 | 45.4 | 91.17 | satisfactory |
| 1 BUDGE: 1 PEGE 200 | 18.8 | 1.25 | 1:1 | 46.6 | 92.02 | satisfactory |
| 1 BUDGE: 2 PEGE 200 | 18.8 | 1.25 | 1:1 | 51.7 | 92.78 | satisfactory |
| PEGE 200 | 18.8 | 1.25 | 1:1 | 61.2 | 93.51 | weak |

As one increases the proportion of PEGE 200 the dimensional change correspondingly increases from ~38% with BUDGE to ~61% with PEGE. Even though the material became less brittle as the proportion of PEGE 200 increased, it also became weaker and contained a higher water content.

Note: Very similar trends are obtained when one uses PVA of 25,000 molecular weight, 98.5% hydrolyzed and 45,000 molecular weight, 99% hydrolyzed.

The following example demonstrates that a high degree of hydrolysis is necessary to activate the crosslinking reaction.

EXAMPLE 7

| Composition PVA | Composition Crosslinker | Concentration Final Solution (%) PVA | Concentration Final Solution (%) NaOH | Ratio PVA:Crosslinker | Observation |
|---|---|---|---|---|---|
| Gelvatol 20-60 (Monsanto) MW = 96,000/85-89% hyd. | BUDGE | 9.7 | 1.29 | 1:1 | did not crosslink into a film |
| | BUDGE | 6.0 | 1.18 | 1:2 | ↓ |
| | BUDGE | 8.1 | 1.08 | 1:3 | ↓ |
| | 1 BUDGE: 1 PEGE 200 | 7.5 | 1.0 | 1:4 | ↓ |
| Vinol 205 (Air Products) MW = 22-31,000/85-89% hyd. | BUDGE | 15.8 | 1.05 | 1:1 | ↓ |
| | 1 BUDGE: 1 PEGE 200 | 15.8 | 1.05 | 1:1 | ↓ |
| Vinol 540 (Air Products) MW = 106-110,000/87-89% hyd. | BUDGE | 10.1 | 1.12 | 1:1 | ↓ |
| | 1 BUDGE: 1 PEGE 200 | 10.1 | 1.12 | 1:1 | ↓ |
| Mowiol 40-88 (Hoechst) n = 40 cps/88% hyd. | BUDGE | 11.4 | 1.27 | 1:1 | ↓ |
| | 1 BUDGE: 1 PEGE 200 | 11.4 | 1.27 | 1:1 | ↓ |
| Aldrich, MW = 96,000/88% hyd. | | | | | ↓ |
| Pretreated for 1 hr at 55° in NaOH | BUDGE | 10.3 | 2.07 | 1:1 | |
| Pretreated for 2 hr at 55° in NaOH | BUDGE | 10.3 | 2.07 | 1:1 | Gel |
| Pretreated for 3 hr at 55° in NaOH | BUDGE | 10.3 | 2.07 | 1:1 | tacky film |
| Pretreated for 3 hr at 55° in NaOH | BUDGE | 9.09 | 3.05 | 1:1 | film - good |

As illustrated above, the lack of crosslinking was not due to a particular molecular weight distribution or manufacturer of polyvinyl alcohol or type of diepoxide but was solely due to the degree of hydrolysis of the polyvinyl alcohol—prolonged exposure of polyvinyl alcohol to high concentration of NaOH facilitated the reaction.

It was found by testing polyvinyl alcohol from several manufacturers having various molecular weights and degrees of hydrolysis that the higher molecular weight polyvinyl alcohol with the greater degree of hydrolysis gave the strongest material. Optimization of polyvinyl alcohol mechanical strength by varying molecular weight and % crosslinker showed that Scientific Polymer Product 115,000, Chang Chun BF-24 and Elvanol 71-30 at a 1:1 PVA to BUDGE ratio gave best results.

If one leaves the crosslinked polyvinyl alcohol in the mold for 2 to 12 hours at ambient temperature it was unexpectedly discovered that the tensile strength increased and this was accompanied by a decrease in the dimensional change on swelling and boiling.

The following example shows mechanical testing results on the three stongest materials. The tensile strength of 1"×3" strips cut from films was measured on a Visco-Tech apparatus. The Visco-Tech, composed of a moving stage and solitary spring and meter is similar to an Instron, typically used for tensile testing, however a much smaller force can be accurately measured in the Visco-Tech. To obtain stress-strain points between zero stress-strain and that at break, a strip of paper was set up so that at various forces, e.g. 25 g, 50 g, a drop of ink dropped on this strip would record the corresponding elongation.

For sheet preparation: 15% polyvinyl alcohol solutions were prepared in hot water and cooled to room temperature. 24 g of polyvinyl alcohol solution was combined with 3.6 g of BUDGE (1/1 ratio) and 4.0 g of 10% NaOH and thoroughly mixed. The viscous solution was centrifuged to remove air bubbles, placed in molds and heated at 55° C. for 1 hour. The molds were removed from the oven and allowed to cool to room temperature—approximately one half hour. Gels were either removed from the molds at this point or allowed to remain in the molds for another 16 hours to several days before removal. All samples were boiled and then equilibrated in water before testing.

EXAMPLE 8

| Sample | Time in Mold (hr) | % Elongation at Break | Breaking Stress psi |
|---|---|---|---|
| Scientific Polymer Products MW = 115,000 | 16 | 142-300 | 6.83-9.34 |
| Chang Chun BF-24 | 0 | 183-308 | 5.29-8.83 |
| Chang Chun BF-24 | 16 | 108-192 | 7.04-11.00 |
| Elvanol 71-30 (DuPont) | 0 | 183-333 | 4.34-5.14 |

| Sample | Time in Mold (hr) | % Elongation at Break | Breaking Stress psi |
|---|---|---|---|
| Elvanol 71-30 (DuPont) | 16 | 83–217 | 7.17–13.18 |

As shown above, the tensile strength increases quite significantly on standing in the mold at room temperature before boiling. In the case of Elvanol 71-30 the breaking stress doubles after standing overnight in the mold. Accompanying this rise in tensile strength is a dramatic decrease in the % elongation at break. Typically the % dimensional change after rapid removal from the mold is ~37% and after 1 or more days is ~30%.

The following example shows the dimensional reproducibility of BUDGE crosslinked polyvinyl alcohol where polyvinyl alcohol=11.4%, BUDGE=11.4%, NaOH=1.3% and the reaction was run at 55° C. for 1 hour with a post reaction time of 1 day in the mold. The samples were run in 10 separate TPX contact lens molds lathed to a final center depth of 0.4 mm.

EXAMPLE 9

| Sample | Initial to Boiled |
|---|---|
| 1 | 28.2 |
| 2 | 27.7 |
| 3 | 28.7 |
| 4 | 28.4 |
| 5 | 28.4 |
| 6 | 28.4 |
| 7 | 28.4 |
| 8 | 30.4 |
| 9 | 28.2 |
| 10 | 30.2 |

As shown above the reproducibility is well within the 1% measurement error.

The following example shows the use of other conventional polyoxiranes.

Reaction Conditions: 12 g of a 15% aqueous PVA (Elvanol 71-30 from DuPont) solution was combined with 1.8 g of the polyoxirane and mixed well at room temperature. 2.0 g of 10% aqueous NaOH was mixed in thoroughly and the mixture centrifuged and poured into sandwich molds. The molds were placed in an oven and the mixture crosslinked at 55° C. for 1 hour. The molds were removed from the oven and allowed to stand overnight at room temperature. Discs were then cut from the sheet with a cork borrer.

EXAMPLE 10

| Sample | % Dimensional Change Initial to Boiled | % Water Content Boiled Film |
|---|---|---|
| ethyleneglycol diglycidyl ether | 39.1 | 94.5 |
| 1,3 diglycidyl glycerol | 38.6 | 94.1 |

What is claimed is:

1. An optically clear soft contact lens of a polyvinyl alcohol which is hydrolized to an extent of at least 93 mol percent and having a weight average molecular weight of at least 10,000 which is crosslinked with a dimensionally stabilizing effective amount of an organic multifunctional oxirane, such that the resulting lens has a water content between about 70 to 98 percent water, based upon the weight of cross-linked lens, and substantially retains its dimensional stability in boiling water.

2. A contact lens according to claim 1 having a water content between about 85–96% by weight water.

3. A contact lens according to claim 1, wherein said oxirane is a polyglycidyl compound of the formula

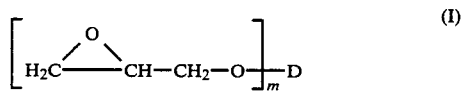

(I)

where m is 2–4,

D is an organic divalent to tetravalent radical the valence of which corresponds to m and wherein each of the glycidyloxy groups are covalently bonded directly to a carbon atom of D.

4. A contact lens according to claim 3, wherein D is aliphatic, heterocylic, aromatic or araliphatic and the glycidyloxy groups are bound thereto directly or through a carbonyl group to form the corresponding polyglycidyl ethers or carboxylate esters.

5. A contact lens according to claim 3, wherein m is 2, and D is aliphatic.

6. A contact lens according to claim 5, wherein D is alkylene of up to 25 carbon atoms, or said alkylene interrupted by one or more oxygen atoms, or by cyclohexylene.

7. A contact lens according to claim 6, wherein D is alkylene of 2 to 6 carbon atoms, or is -$C_2$-$C_4$-alkylene(O-$C_2$-$C_4$ alkylene)$_p$, where p is 1 to 5.

8. A contact lens according to claim 4, where D is aromatic.

9. A contact lens according to claim 1, wherein said oxirane is a polyglycidyl compound of the formula.

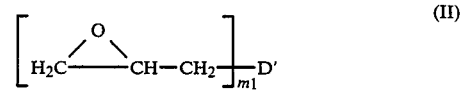

(II)

wherein $m_1$ is 2–4, and

D′ is an organic divalent to tetravalent radical, the valence of which corresponds to $m_1$ and wherein each of the glycidyl radicals thereof are covalently bonded to a nitrogen or carbon atom of D′.

10. A contact lens according to claim 9, wherein $m_1$ is 2 and D′ is a bivalent hydantoin radical.

11. A contact lens according to claim 9, wherein $m_1$ is 2 and D′ is alkylene of up to 6 carbon atoms.

12. A contact lens according to claim 1, wherein said oxirane is a polyoxirane compound of the formula

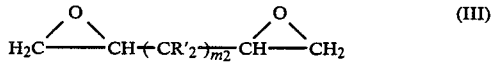

(III)

where $m_2$ is 0, 1 or 2, and each R′ is independently hydrogen or lower alkyl.

* * * * *